(12) United States Patent
Eckert et al.

(10) Patent No.: US 8,072,103 B2
(45) Date of Patent: Dec. 6, 2011

(54) DYNAMOELECTRIC MACHINE HAVING A MULTI-PART PLUG HOUSING

(75) Inventors: Rainer Eckert, Herschfeld (DE); Dirk Grosse-Benne, Menden (DE)

(73) Assignee: Siemens Aktiengesellschaft, München (DE)

( * ) Notice: Subject to any disclaimer, the term of this patent is extended or adjusted under 35 U.S.C. 154(b) by 190 days.

(21) Appl. No.: 12/534,527

(22) Filed: Aug. 3, 2009

(65) Prior Publication Data
US 2010/0026116 A1 Feb. 4, 2010

(30) Foreign Application Priority Data

Aug. 4, 2008 (EP) ..................................... 08013949

(51) Int. Cl.
*H02K 5/22* (2006.01)
*H01R 3/00* (2006.01)

(52) U.S. Cl. .......................................... 310/71; 439/164
(58) Field of Classification Search .................... 310/71; 439/164; *H02K 5/22*
See application file for complete search history.

(56) References Cited

U.S. PATENT DOCUMENTS

| | | | | |
|---|---|---|---|---|
| 2,634,344 A | * | 4/1953 | Robinson, Jr. et al. | 200/51.07 |
| 4,851,725 A | * | 7/1989 | Keck | 310/71 |
| 5,934,096 A | * | 8/1999 | Munson et al. | 62/298 |
| 5,949,167 A | * | 9/1999 | Blalock et al. | 310/71 |
| 7,025,595 B1 | * | 4/2006 | Chan et al. | 439/6 |
| 7,056,104 B2 | * | 6/2006 | Kimura et al. | 417/410.1 |
| 7,141,900 B2 | * | 11/2006 | Nakamura et al. | 310/68 D |
| 2004/0061391 A1 | * | 4/2004 | Matsuyama et al. | 310/71 |
| 2006/0043803 A1 | * | 3/2006 | Yagi | 310/68 B |

FOREIGN PATENT DOCUMENTS

DE 202006017131 U1 1/2007

* cited by examiner

*Primary Examiner* — Tran Nguyen
*Assistant Examiner* — Thomas Truong
(74) *Attorney, Agent, or Firm* — Henry M. Feiereisen; Ursula B. Day

(57) ABSTRACT

A dynamoelectric machine includes a stator in which a winding system is positioned, and at least a multi-part plug housing with a pivot joint between housing parts of the plug housing. The plug housing has at least one plug-type connector with at least two plugging elements. At least one housing part of the plug housing is made of electrically conductive material and connected to at least one plugging element by a flexible electric line. The electrically conductive housing part of the plug housing faces the dynamoelectric machine and is connected in an electrically conductive fashion to an electrically conductive surface of a motor housing of the dynamoelectric machine.

4 Claims, 2 Drawing Sheets

DYNAMOELECTRIC MACHINE HAVING A MULTI-PART PLUG HOUSING

CROSS-REFERENCES TO RELATED APPLICATIONS

This application claims the priority of European Patent Application, Serial No. 08013949, filed Aug. 4, 2008, pursuant to 35 U.S.C. 119(a)-(d), the content of which is incorporated herein by reference in its entirety as if fully set forth herein.

BACKGROUND OF THE INVENTION

The present invention relates, in general, to a dynamoelectric machine having a multi-part plug housing.

The following discussion of related art is provided to assist the reader in understanding the advantages of the invention, and is not to be construed as an admission that this related art is prior art to this invention.

Electric equipment, for example dynamoelectric machines, are supplied with electrical energy via electric connecting lines, using plug-type connectors which also serve to transmit signal generator signals and sensor signals as well as performing functional grounding. Functional grounding is of considerable importance for interference-free functioning of the electric equipment. In this context, a differentiation is generally made between two types of grounding—protective grounding and functional grounding. While protective grounding serves to protect people and animals against electric shocks and is intended to provide protection only in the event of a fault, functional grounding constitutes a functional part of the usual operation of the electric equipment and is therefore essential for fault-free operation of the respective electric equipment.

Electric equipment, in particular in the case of industrial systems engineering, usually includes a metal housing which has to be provided with protective grounding for this reason and to comply with relevant DIN standards. Furthermore, functional grounding, which has the purpose of ensuring that the electric equipment is installed appropriately for EMC (electromagnet compatibility) is provided by the ground connection of the metal housing. Since the purpose of the protective ground is not aimed at the functioning of a piece of equipment but rather primarily serves for protecting persons, protective grounding alone is often not sufficient to ensure the electromagnetic compatibility of the electric equipment in addition to protecting persons. As a result, it is usually necessary to connect an additional functional ground. In this context, care should be taken to make sure that the functional ground and the protective ground are separated. There should normally be not connection of the protective ground to the functional ground.

The functional ground is generally not configured to perform protective conductor functions, and therefore when a protective conductor is connected to the functional grounding terminal the electrical safety of personnel is not ensured. A conductive connection between the protective ground and the functional ground is usually only provided in the vicinity of the actual ground. Operator protection has priority when performing grounding. Functional grounding of a piece of electric equipment is only given secondary importance.

Functional grounding has essentially the following objectives:
conduction away of interference currents and therefore improvement of the EMC,
definition of a necessary common reference potential in order to ensure operation of electric equipment.

Protective conductors must be dimensioned to comply with the DIN-VDE specifications (DIN-VDE 0100 part 540 grounding, protective conductors, equipotential bonding conductors), and a correctly dimensioned protective conductor is suitable for conducting away electromagnetic interference only to a limited degree. Combined protective and functional grounding conductors should not only have the required cross section, but also a large surface area. In other words, the surface, in particular metallic surfaces, of the electric equipment should be connected in all cases to ground via a protective conductor connection in order to ensure adequate protection of persons. In the case of a single-part plug housing, a grounding pin of the plug is conductively connected to the plug housing, and the plug housing is in turn conductively connected to the electric equipment. A separate grounding line between the electric equipment and the plug is therefore not necessary.

However, in the case of multi-part plug housings whose parts are connected, for example, by a pivot joint, there is the risk of a conductive connection between these parts no longer being adequately ensured by the housing or via the pivot joint of the plug. This is the case, in particular, in the event of a fracture of the pivot joint.

In order to obtain grounding, a separate grounding line is led from the grounding pin of the plug to a conductive part of the motor housing in order always to be able to ensure adequate protection of persons. This grounding line is absolutely necessary if, for example owing to mechanical loading, the plug housing breaks at the pivot joint, and a conductive connection to the surface of the electric equipment is therefore interrupted. The motor in this case would continue to be operationally capable via the connecting lines but in the case of a fault, for example a short to ground of the winding, persons would no longer be protected.

The provision of a separate grounding line between the grounding pin of the plug and the electric equipment is disadvantageous because of the additional costs of such a high-temperature braided conductor line, an additional cable lug, the mounting of the line on the motor and plug, as well as a bore and a thread, for example in the motor end plate for attaching the cable lug. In particular in the case of motors which have a compact design and a low axle height, such mounting is particularly complicated.

It would therefore be desirable and advantageous to provide an improved dynamoelectric machine having a multi-part plug housing to obviate prior art shortcomings and to ensure sufficient protection of persons and, in particular in the case of dynamoelectric machines with a small axle height, to simplify assembly without adversely affecting operator protection.

SUMMARY OF THE INVENTION

According to one aspect of the present invention, a dynamoelectric machine includes a motor housing, a stator received in the motor housing, a winding system positioned in the stator, a plug housing having plural housing parts and a pivot joint between the housing parts, at least one of the housing parts of the plug housing being made of electrically conductive material, a plug-type connector having at least two plugging elements, and a flexible electric line connecting the at least one housing part of electrically conductive material to at least one of the plugging elements, wherein the at least one housing part of electrically conductive material faces the motor housing is connected in an electrically conductive fashion to an electrically conductive surface of the motor housing.

In the description, the term "pivot joint" is to be understood as relating to a joint which permits two adjacent parts of a plug housing to move not only in one plane but also permits three-dimensional degrees of freedom according to a ball joint or hip joint of a human body.

The housing parts of the plug housing which are moveable with respect to one another and which carry out a movement by means of a pivot joint are now electrically connected with a flexible line. In this context, the housing part of the plug housing which faces the dynamoelectric machine is directly connected to the motor housing of the dynamoelectric machine in a fixed and non-rotatable fashion. The other housing part or parts of the plug housing of this plug are connected to one another via one or more pivot joints, with the result that virtually any desired orientation of the plug on the machine can be brought about.

In accordance with the present invention, the flexible line, i.e. grounding line, is not loaded mechanically to a greater extent than other motor connecting lines which lead from the line pin in the plug housing through the housing parts of the plug housing for the winding of the dynamoelectric machine into the housing of the dynamoelectric machine.

According to another advantageous feature of the present invention, the electric line may be embodied as a grounding line in the manner of a coil. As a result, even in the case of a possible fracture, in particular of the pivot joint for mechanically connecting the two housing parts of the plug housing, the grounding line is prevented from tearing off so that the motor connecting lines would tear off first before protection of persons is no longer ensured. The housing part of the plug housing which faces the motor housing and is attached thereto also has a grounding pin so that the grounding line leads from this grounding pin to the grounding pin of the plug conductor.

Protective conductor grounding of the motor housing is achieved by virtue of the fact that the housing part of the plug housing, which faces the motor and which advantageously forms a flange and is electrically conductive, is placed in electrically conductive contact with the metallic surface of the dynamoelectric machine. These contact surfaces between the housing part of the plug housing and the surface of the dynamoelectric machine have to be free of grease and dirt. Furthermore, the surface of the machine is devoid of a surface coating, at least at this contact point, and devoid of any oxide layer in order to reduce the contact resistance.

In order to avoid oxide layers subsequently arising on these contact points, a welded connection may advantageously be preferred over screw connections.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
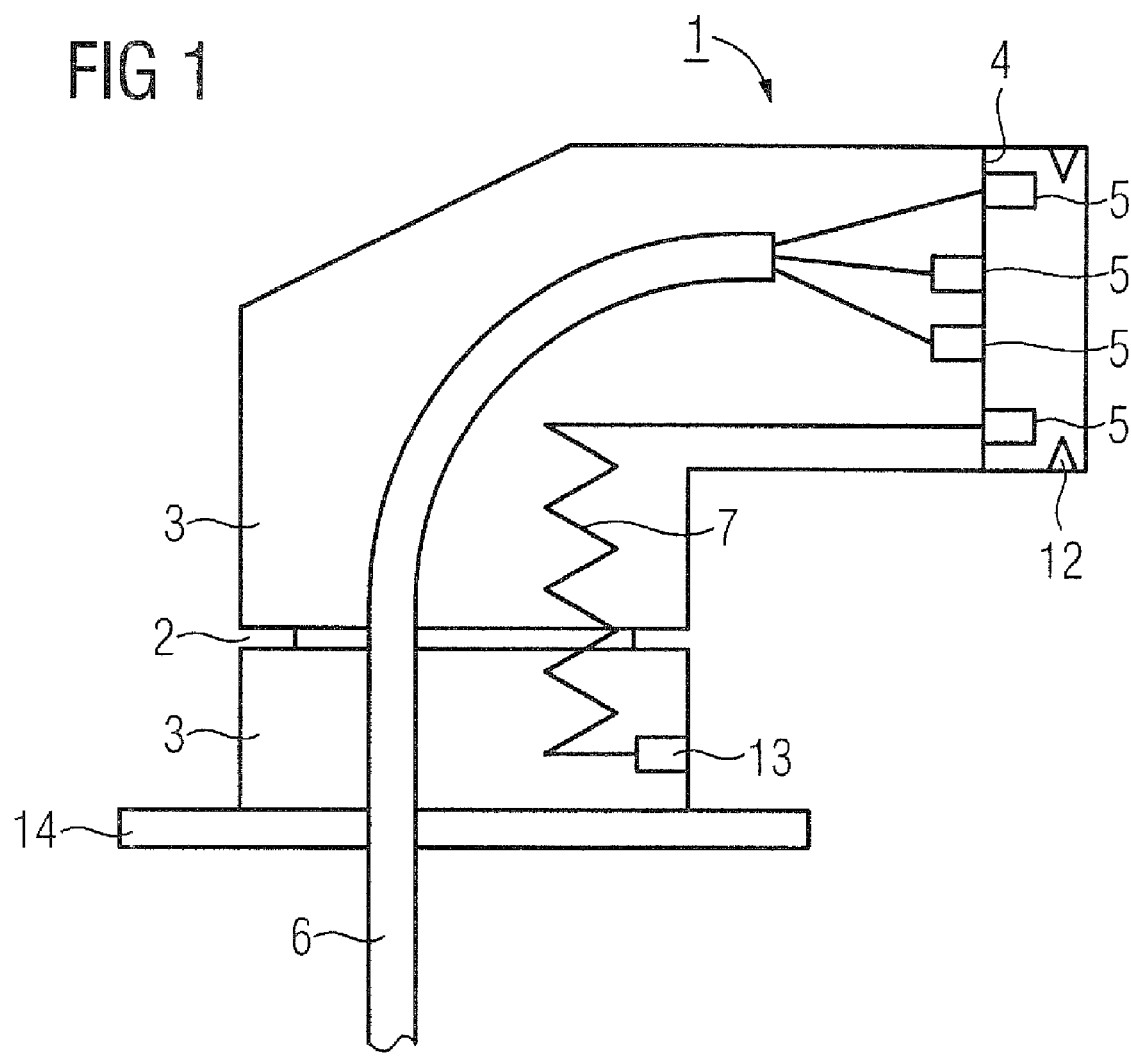
FIG. 1 shows a basic illustration of a plug according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a basic illustration of a plug according to the present invention, having a plug housing 1 which is of bent design and has a pivot joint 2. The plug housing 1 has two housing parts 3 connected to one another via the pivot joint 2 to allow relative mobility. Of course, the present invention is not limited to a two-part plug housing 1 but the principles described in the following description with respect to the two-part plug housing are equally applicable to plug housings 1 comprised of three, four or more housing parts.

The housing parts 3 of the plug housing 1 can move with respect to one another and each have a cavity in which connecting lines 6 of the electric equipment, in particular power supply lines of a dynamoelectric machine 15 and a flexible grounding line 7 and/or sensor lines (not illustrated in more detail) extend. Since the pivot joint 2 is also of hollow design, all of these lines are laid in a protected fashion.

Both the connecting line 6 and the grounding line 7 are led to a plug-type connector 4. Plug-type connectors 4 serve to disconnect or connect lines. These lines conduct, for example, a current or signals, or provide grounding.

In the case of electric plug-type connectors 4, a differentiation is made between the male part of a plug-type connector (with contact pins pointing outward) and the female part (with contact openings pointing inward). The male part in turn is a plug if it is attached to the end of a cable, or a built-in plug if it is permanently built into a housing. The female part is a coupling if it is attached to the end of a cable or a socket if it is permanently built into a housing. There are also plug-type connectors 4 with plugging elements of both sexes.

This is illustrated, by way of example, using the plug-type connector 4 of the present plug housing 1 in which different plugging elements 5 are arranged by way of example. A contact between a cable and this plug-type connector 4 has complementary plugging elements. In order to avoid a cable with a plug 11 becoming unintentionally detached from the plug-type connector 4, locking elements 12 (illustrated in basic form) are attached to the plug housing 1, in particular to this housing part 3 of the plug housing 1. The locking elements 12 serve to relieve the mechanical loading on the electric connecting pins and to provide the securing force which is necessary for contact to be formed satisfactorily.

Such connections can also be realized by snap-in connections which can be comparatively easily detached manually when necessary, therefore allowing the plug to be easily pulled off.

Screw connections or union nuts are also suitable for external connections of the plug 11 to the plug-type connector 4 via the plug housing 1, but are not illustrated in more detail.

The housing part 3 of the plug housing 1 at the top with the plug-type connector 4 is extended axially over the plugging elements 5, so that contact protection can also be ensured there. This partial encapsulation likewise provides a certain degree of protection against dust and corrosion to the plugging elements 5.

In accordance with the present invention, the plug housing 1 has a grounding connection via the grounding line 7 of its two plug housing parts 3, which grounding connection leads from a grounding contact point 13 to a plugging element 5 of the plug-type connector 4. When contact is formed between the plug-type connector 4 and an external plug 11, grounding is ensured here, for example, by means of a system ground, and protection of persons is therefore provided.

The lower housing part of the plug housing advantageously has a flange 14 with which contact is formed with electric equipment, in particular with the motor housing 18 of a dynamoelectric machine 15.

Figure 2:
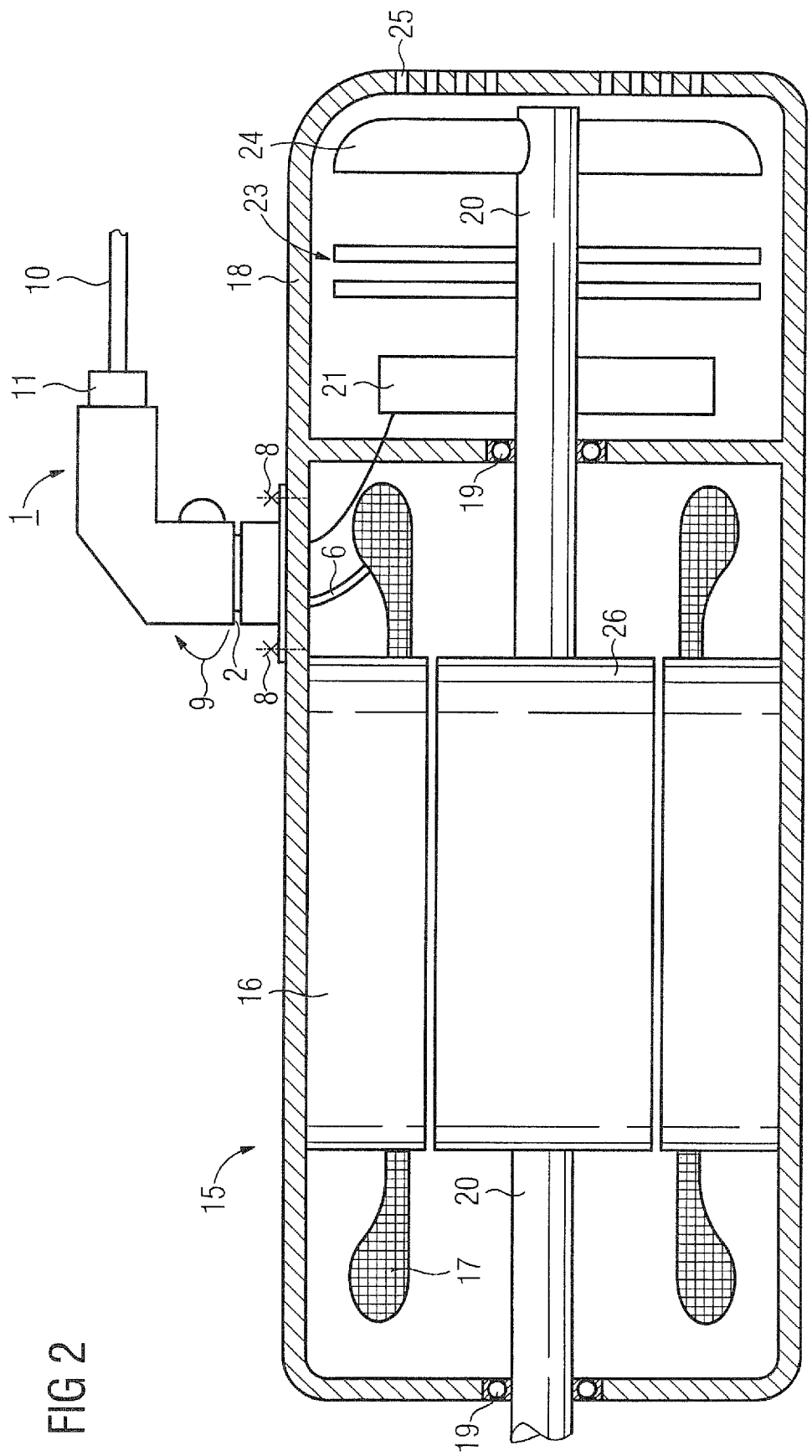
FIG. 2 shows a partly sectional view of a dynamoelectric machine having incorporated therein a plug according to the present invention.

FIG. 2 shows a basic illustration of the plug housing 1 which is provided, for example, on a dynamoelectric machine 15. In the case of such a dynamoelectric machine 15, the plug housing 1 serves to feed in the electric lines and the functional and/or protective grounding of the dynamoelectric machine 15. Furthermore, electric signal lines or signal generator signals can also be conducted via or in the plug housing 1.

Such a dynamoelectric machine 15 is, however, not restricted to merely one plug housing 1 but rather two or three such plug housings 1 can likewise be located on one dynamoelectric machine 15. The further plug housings are not necessarily also embodied in a plurality of parts here, i.e. dynamoelectric machines 15 having either one or a plurality of multi-part, in particular two-part, plug housings are conceivable, as are dynamoelectric machines having a multi-part plug housing 1 and further single-part plug housings which do not have any mobility. This depends, inter alia, on the number of lines running in the plug housing, the size of the machine and the plugging contacts.

This dynamoelectric machine 15 is located in a motor housing 18 which has a stator 16 in which a winding system 17 is arranged. The power supply of this winding system 17 is, for example, provided, as is illustrated in principle, via connecting lines 16 which lead from the feed line 10 to the winding system 17 via the plug 11 and the plugging elements 5 of the plug-type connector 4. A rotor 26 drives a shaft 20 on the basis of an electromagnetic interaction with the stator 16. For example a signal generator 21 and/or a brake 23, whose braking effect occurs by virtue of the fact that one disk can be pushed axially against the other, and/or a fan 24 are located on this shaft 20. The fan 24 causes forced movement of air for the sake of cooling during operation by means of breakthroughs 25 on the motor housing 18.

The plug housing 1, in particular the housing part 3 of the plug housing 1 which bears directly on the motor housing 18, is placed in contact with the motor housing 18 and is made of electrically conductive material. This electrical connection, which is produced in principle by screws 8, permits an electrical connection to be made from the motor housing 18 via the screws 8 and/or the flange 14 to the part 3 of the plug housing with its grounding contact point 4, and from there via the grounding line 7 and/or the pivot joint to the plugging element 5 which is embodied as a grounding pin and is led to the ground via the plug 11 and the feed line 10. The housing part 3 of the plug housing which has the plug-type connector 4 is also grounded via the grounding pin.

An intact pivot joint 2 also provides grounding via its components, i.e. the half shells are in contact with one another. However, if the pivot joint 2 fractures, the grounding line 7 now ensures protection of persons in all cases.

The formation of electrical contact between the housing part 3 of the plug housing 1 which is located on the motor housing 18 can also be carried out by welding, riveting and the other connection techniques which are known in the prior art. The region on the motor housing 18 which is now intended, together with the flange 14 and/or the screws 8, to provided a grounding connection to the part 3 of the plug housing and therefore to the grounding contact point 13 has to be free of grease and dirt so that no excessively high contact resistances occur.

While contact is being formed between the housing part 3 of the plug housing 1 and the motor housing 18, the motor housing 18 will likewise advantageously not yet have a surface coating and not have oxide layers. In order to avoid subsequently arising oxide layers at this contact point it is advantageous to provide a welded ground connection between the flange 14 and the motor housing 18.

The entire plug housing 1 can now advantageously be premounted with its plug-type connectors 4 and plugging elements 5 as well as with the grounding lines 7. All that is necessary is to lead the connecting lines 6 for the winding system 17 through the plug housing 1 with its parts 3 of the plug housing and the pivot joint 2, in order to connect said winding system 17 electrically to the plugging elements 5 of the plug-type connector 4.

As a result of the helical or coiled configuration of the grounding line 7, as illustrated in principle in FIG. 1, the grounding connection is always maintained and therefore the protection of persons always ensured even in the event of a fracture of the pivot joint 2 and/or tearing off of the connecting lines 6. According to the invention, the contact which the grounding connection would lose last would be that between the metallic surface of the dynamoelectric machine and the electric ground.

In the event of a fault, i.e. the metallic surface of the dynamoelectric machine would be connected to an electrical voltage owing to a short to ground of the winding system, the flange 14 and the lower metallic housing part 3 of the plug housing which is mechanically and electrically connected thereto would also be connected to electrical voltage via the contact formed, for example, via screws 8 or welded connections. According to the invention, this voltage is now passed on to a plugging element 5 via the grounding pin 13 and the grounding line 7, said plugging element 5 being connected to the system ground via a plug 11.

Even in the event of a fracture of the pivot joint 2 which connects the two parts of the plug housing 1, and which is normally also to be drawn to ground if both parts 3 of the plug housing are metallic, the grounding and therefore the protection of persons are ensured in all cases.

This grounding concept according to the invention now allows the entire plug with its housing parts 3 of the plug housing 1, the plug-type connector 4 and the flexible grounding line or lines 7 which run internally to be prefabricated. The connecting lines 6, and if appropriate further signal generator lines or sensor lines or lines for functional grounding, can now be simply led through the cavities in the plug housing 1 during mounting and placed in contact with the plug-type connector 4.

The grounding, in particular for the purpose of the protection of persons, is therefore provided solely by the formation of contact between the flange 14 and the metallic surface of the dynamoelectric machine. The complex mounting of a separate grounding line from the interior of the machine, for example from an end plate to a plugging element 5 for the system ground, is avoided. This is extremely advantageous, in particular in machines with a small axle height.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A dynamoelectric machine, comprising:
   a motor housing;
   a stator received in the motor housing;
   a winding system positioned in the stator;
   a plug housing having plural housing parts and a pivot joint between the housing parts, at least one of the housing parts of the plug housing being made of electrically conductive material;
   a plug-type connector having at least two plugging elements; and
   a flexible electric line connecting the at least one housing part of electrically conductive material to at least one of the plugging elements,
   wherein the at least one housing part of electrically conductive material faces the motor housing is connected in an electrically conductive fashion to an electrically conductive surface of the motor housing.

2. The dynamoelectric machine of claim 1, wherein the electric line is arranged inside the plug housing.

3. The dynamoelectric machine of claim 1, wherein the electric line is embodied as a grounding line in the manner of a coil.

4. The dynamoelectric machine of claim 1, further comprising a screw connection or soldered connection to establish the electrically conductive connection to the surface of the motor housing.

* * * * *